United States Patent
St. Clair

(12) 
(10) Patent No.: US 6,211,292 B1
(45) Date of Patent: Apr. 3, 2001

(54) FUNCTIONALIZED BLOCK COPOLYMERS CURED WITH ISOCYANATES

(75) Inventor: David J. St. Clair, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 08/423,438

(22) Filed: Apr. 18, 1995

Related U.S. Application Data

(62) Division of application No. 07/727,174, filed on Jul. 9, 1991, now Defensive Publication No.H1564.

(51) Int. Cl.$^7$ ........................................................ C08F 8/00
(52) U.S. Cl. ............................ 525/98; 525/123; 525/303
(58) Field of Search .............................. 427/445; 525/123, 525/98, 303

(56) References Cited

U.S. PATENT DOCUMENTS

| | | | |
|---|---|---|---|
| 2,417,424 | 3/1947 | Latham | 525/123 |
| 3,582,499 | 6/1971 | Rogers et al. | 521/146 |
| 3,629,172 | 12/1971 | Jones | 260/23.7 |
| 3,659,003 | 4/1972 | Johnson et al. | 525/303 |
| 3,674,743 | 7/1972 | Verdol et al. | 260/73 L |
| 3,714,110 | 1/1973 | Verdol et al. | 260/33.6 AQ |
| 3,900,532 | 8/1975 | Dietrich et al. | 525/123 |
| 3,904,801 | 9/1975 | Harlan, Jr. | 428/246 |
| 3,987,012 | 10/1976 | Statton | 260/77.5 CR |
| 4,021,391 | 5/1977 | Ijichi et al. | 525/123 |
| 4,152,309 | 5/1979 | Ijichi et al. | 528/51 |
| 4,425,450 | 1/1984 | Horvath | 525/123 |
| 4,574,140 | 3/1986 | Sandstrom et al. | 525/374 |
| 4,578,429 * | 3/1986 | Gergen et al. | 525/291 |
| 4,721,754 | 1/1988 | Baghdadchi | 525/194 |
| 4,783,504 * | 11/1988 | St. Clair et al. | 525/72 |
| 4,820,368 * | 4/1989 | Markevka et al. | 156/307.3 |
| 4,837,273 | 6/1989 | Wamprecht et al. | 525/123 |
| 4,882,384 * | 11/1989 | Willis et al. | 525/105 |
| 4,883,834 | 11/1989 | Yamamoto et al. | 525/66 |
| 5,008,337 | 4/1991 | Patel | 525/123 |
| 5,112,911 * | 5/1992 | Mori et al. | 525/100 |
| 5,250,607 * | 10/1993 | Comert et al. | 524/507 |

FOREIGN PATENT DOCUMENTS

| | | | |
|---|---|---|---|
| 2548244 | 5/1976 | (DE) | 525/123 |
| 3131848 | 2/1983 | (DE) | 525/123 |
| 0247426 | 12/1987 | (EP) | 525/123 |
| 63-086712 | 4/1988 | (JP) | C08G/18/62 |
| 1-263109 | 10/1989 | (JP) . | |

OTHER PUBLICATIONS

"Coatings Based on Polyurethane Chemistry: An Overview in Recent Developments," by T.A. Potter & J.L. Williams, vol. 59, Jun. 1987.

"The Chemistry of Polyurethane Coatings," a general reference manual published by Mobay Corporation in 1988.

"Polyurethane Handbook," edited by Dr. Gunter Oertel, published in 1985, pp. 7–19.

Applied Polymer Science, 2nd Edition, edited by Tess and Poehlein, published in 1985, pp. 985–1029.

"Organic Polymer Chemistry," K.J. Saunders, Chapman and Hall, New York (1988) pp. 476–482.

"Handbook of Adhesives," van Nostrand Reinhold, New York (1962) pp. 333–343.

\* cited by examiner

*Primary Examiner*—Robert Dawson
(74) *Attorney, Agent, or Firm*—Donald F. Haas

(57) ABSTRACT

The present invention describes an isocyanate-cured hydroxy, acid or amine functionalized selectively hydrogenated block copolymer of a vinyl aromatic hydrocarbon and a conjugated diene. The present invention also describes coatings, adhesives, sealants and modified asphalts made therewith.

1 Claim, No Drawings

FUNCTIONALIZED BLOCK COPOLYMERS CURED WITH ISOCYANATES

This is a division of application Ser. No. 07/727,174, filed Jul. 9, 1991, now Statutory Invention Registration H1564.

This invention relates to isocyanate-cured block copolymers. Further, it relates to coatings, sealants, adhesives and modified asphalts made from such block copolymers.

BACKGROUND OF THE INVENTION

Conventional A-B-A block copolymers are known to be useful in coatings, sealants, adhesives and modified asphalts but their usefulness in such products is not as great as it could be if these polymers did not suffer from deficiencies in certain physical properties such as creep resistance and solvent resistance. For instance, U.S. Pat. No. 3,792,005 disclosed that coatings can be made using block copolymers of A—B—A type where A is a monovinyl aromatic polymer block, usually polystyrene (S), and B is a rubber polymer block, usually hydrogenated polybutadiene (EB) or hydrogenated polyisoprene (EP). These polymers could be especially useful in elastomeric coatings because they can be formulated to have good flexibility and therefore, will not crack during thermal cycling, an important requirement for roof coatings for example, or during metal forming, where the coating becomes stretched as the metal is bent. However, coatings based on conventional A—B—A type block copolymers are deficient in that they lack strong adhesion and in applications in which the coating will contact organic liquids such as gasoline, the coatings will merely dissolve off of the substrate.

It would be advantageous to provide block polymers of this type which had increased creep and solvent resistance. By functionalizing these conventional block polymers, they can then be crosslinked to give polyurethane and polyurea structures which perform better at high temperatures and are thus more useful than the conventional block polymers in many coatings, sealants, adhesives and modified asphalt applications.

SUMMARY OF THE INVENTION

The present invention provides isocyanate cured hydroxy, acid or amine functionalized selectively hydrogenated block copolymers of vinyl aromatic hydrocarbons and conjugated dienes. The polymers are produced by selectively hydrogenating the block copolymer, grafting thereon a hydroxy, acid or amine functional monomer and then curing the polymer through the functionalization with isocyanate. Such polymers are useful for coatings, adhesives, sealants and modified asphalts, among other things.

The present invention demonstrates that both the creep and solvent resistance limitations can be overcome by using such crosslinked functionalized polymers while maintaining the many advantages of conventional block copolymers in adhesives, coatings, sealants and modified asphalts. Specifically, the cured functionality on the polymer improves these properties.

According to the present invention, there is provided a process and corresponding product for coating substrates which comprises coating at least one surface of a substrate with an isocyanate-cured selectively hydrogenated functionalized block copolymer of a vinyl aromatic hydrocarbon and a conjugated diene. The functional groups, which are hydroxy, acid or amine, are grafted on to the polymer in an amount from about 0.1 to about 10 weight percent and then are cured with isocyanate to improve the physical properties of the copolymer.

DETAILED DESCRIPTION OF THE INVENTION

Selectively Hydrogenated Block Copolymers

Block copolymers have been produced which comprise primarily those having a general structure

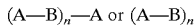

wherein the polymer blocks A comprise thermoplastic polymer blocks of vinylarenes such as polystyrene, wherein block B is a polymer block of a selectively hydrogenated conjugated diene and wherein n is 1 or greater. The proportion of the thermoplastic terminal blocks to the center elastomeric polymer block and the relative molecular weights of each of these blocks is balanced to obtain a rubber having an optimum combination of properties such that its behavior resembles that of a vulcanized rubber without requiring the actual step of vulcanization. Moreover, these block copolymers can be designed not only with this important advantage but also so as to be handled in thermoplastic processing equipment and are soluble in a variety of relatively low cost solvents.

The process by which the block copolymers are prepared is not critical to this invention. However, the block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627. As is well known in the block copolymer art, tapered copolymer blocks can be incorporated in the multiblock copolymer by copolymerizing a mixture of conjugated diene and vinyl aromatic hydrocarbon monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356. The disclosures of all of the patents listed in this paragraph are incorporated herein by reference.

Conjugated dienes which may be utilized to prepare the polymers and copolymers are those having from 4 to 8 carbon atoms and include 1,3-butadiene, 2-methyl-1,3-butadiene(isoprene), 2,3-dimethyl-1,3-butadiene, 1,3-pentadiene, 1,3-hexadiene, and the like. Mixtures of such conjugated dienes may also be used. The preferred conjugated diene is 1,3-butadiene.

Vinyl aromatic hydrocarbons which may be utilized to prepared selectively hydrogenated block copolymers include styrene, o-methylstyrene, p-methylstyrene, p-tert-butylstyrene, 1,3-dimethylstyrene, alpha-methylstyrene, vinylnaphthalene, vinylanthracene and the like. The preferred vinyl aromatic hydrocarbon is styrene.

While these block copolymers have a number of outstanding technical advantages, one of their principal limitations lies in their sensitivity to oxidation. This was due to their unsaturated character which can be minimized by hydrogenating the copolymer, especially in the center section comprising the polymeric diene block. Hydrogenation may be effected selectively as disclosed in U.S. Pat. No. Re 27,145 which is incorporated by reference herein. These polymers are hydrogenated block copolymers having a configuration, prior to hydrogenation, of $(A—B)_n—A$ or $(A—B)_n$ wherein each of the A's is an alkenyl-substituted aromatic hydrocarbon polymer block and B is either a butadiene polymer block wherein 30–55 mol percent of the condensed butadiene units in the butadiene polymer block have the 1,2 configuration, or B is an isoprene polymer block having predominately 1,4 configuration. Other dienes can also be used.

The hydrogenation of these polymers and copolymers may be carried out by a variety of well established processes including hydrogenation in the presence of such catalysts as Raney Nickel, noble metals such as platinum, palladium and the like, soluble transition metal catalysts and titanium catalyts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986 and 4,226,952, the disclosures of which are incorporated herein by reference. The polymers and copolymers are hydrogenated in such a manner as to produce hydrogenated polymers and copolymers having a residual unsaturation content in the polydiene block of from about 0.05 to about 20 percent of their original unsaturation content prior to hydrogenation, and above about 50 percent of the original unsaturation in the alkenyl-substituted aromatic hydrocarbon block.

Functionalized Block Copolymer

The selectively hydrogenated $(A—B)_n—A$ or $(A—B)_n$ block copolymers are deficient in many applications in which adhesion is required due to their hydrocarbon nature. However, the placement onto the block copolymers of the hydroxy, acid or amine functional groups, improves adhesion. In addition, this allows the polymer to be cured with isocyanates to produce polymers with better adhesion, better creep resistance and better solvent resistance and thereby extends the range of applicability of these polymers.

The particular process used to functionalize the selectively hydrogenated block copolymers is not critical to this invention. However, the acid and hydroxy functionalized polymers can be prepared as taught by U.S. Pat. No. 4,578,429 which is incorporated herein by reference. The patent describes the grafting of monomers to secondary and tertiary carbon atoms on the hydrogenated diene component of the block copolymers.

These functionalities can also be incorporated in the styrene block as described in U.S. Pat. No. 4,145,298. The selectively hydrogenated block polymers are carboxylated to introduce carboxylic acid functionality into the aromatic portion of the block polymer molecule. The carboxylic acid functionality is introduced by consecutive steps of metallation, carboxylation and acidification. The process of metallation comprises the creation of chemically active sites on the aromatic rings of the aromatic portion of the block polymer by reaction of the polymer and an active metal compound, particularly when the active metal of the active metal compound is an alkali metal. The metallation reaction typically takes place at a temperature from about 0° C. to about 100° C. in the liquid phase in the presence of an inert reaction diluent, for example, a saturated aliphatic hydrocarbon such as cyclohexane. This process of metallation is known in the art, being described more fully in U.S. Pat. No. 4,145,298, which is herein incorporated by reference.

The carboxylation process which is applied to the metallated, selectively hydrogenated block polymer is also well known in the art. The metallated polymer is contacted with gaseous carbon dioxide by passing the carbon dioxide through a solution of the metallated polymer in an inert reaction diluent which is preferably the diluent in which the metallated polymer is produced. This process is described more fully in U.S. Pat. No. 4,145,490, U.S. Pat. No. 3,976,628 and published European Patent Application 215,501 which are herein incorporated by reference. The metallated polymer reacts with the carbon dioxide to produce a metal salt, typically an alkali metal salt, of the carboxyated selectively hydrogenated block polymer and thereby introduces carboxylate functionality into the polymer. This metal salt is acidified as by contact with dilute mineral acid such as hydrochloric acid or an organic acid, such as acetic acid, and the resulting carboxylic acid functionalized polymer is recovered by conventional methods such as selective extraction or filtration, following if necessary, precipitation with a non-solvent.

The hydroxy functionalized block copolymer useful in the present invention is preferably prepared by graft reacting an unsaturated hydroxy-containing compound, such as allyl alcohol, 2-hydroxyethylacrylate, 3-hydroxypropylacrylate, 4-hydroxybutylacrylate or the corresponding methacrylates, etc., with a selectively hydrogenated A—B—A block copolymer wherein the A component is predominately a polymerized vinyl aromatic hydrocarbon, and the B component prior to hydrogenation is predominately a polymerized conjugated diene. The A component is preferably polystyrene and is preferably hydrogenated to a final unsaturation above 50 percent of the original unsaturation. The B component is preferably poly(1,3-butadiene) or polyisoprene and should be hydrogenated to an unsaturation that is less than 10 percent of the original unsaturation, preferably less than 5% of the original unsaturation. Monomers which can be used include hydroxyl group containing compounds, preferably hydroxy $C_1$–$C_{20}$ alkyl acrylates or methacrylates such as 2-hydroxyethylacrylate. Of course, mixtures of monomers can be also added so as to achieve graft copolymers in which the graft chains contain at least two different monomers therein (in addition to the base polymer monomers).

The acid functionalized block copolymers useful in the present invention are preferably prepared by reacting a monocarboxylic or polycarboxylic acid compound, such as maleic acid or a derivative such as maleic anhydride, with a selectively hydrogenated A—B—A block copolymer. The preferred acid compounds are unsaturated monocarboxylic and polycarboxylic-containing acids ($C_3$–$C_{10}$) with preferably at least one olefinic unsaturation, and anhydrides, salts, esters, ethers and other substituted derivatives from such acids. Examples of such materials include maleic acid, fumaric acid, itaconic acid, citraconic acid, acrylic acid, acrylic polyethers, acrylic anhydride, methacrylic acid, crotonic acid, isocrotonic acid, mesaconic acid, angelic acid, maleic anhydride, itaconic anhydride and citraconic anhydride. The preferred monomers to be grafted to the block copolymers according to the present invention are maleic anhydride, maleic acid, fumaric acid and their derivatives.

The grafting reaction is initiated by a free radical initiator which is preferably an organic peroxygen compound. Special preferred peroxides are 2,5-dimethyl-2,5-di(t-butylperoxy)hexane (Lupersol 101), di-t-butylperoxide, 2,5-dimethyl-2,5-di-tert-butylperoxy-3-hexane (Lupersol 130) α,α'-bis(tert-butylperoxy)diisopropylbenzene (VulCup R), or any free radical initiator having a short half-life under the base polymer processing conditions. See pages 66–67 of *Modern Plastics*, November 1971, which is incorporated by reference herein, for a more complete list of such compounds.

The grafted polymer may contain from 0.1 to 10, preferably 0.2 to 5 weight percent, of the grafted monomer to improve the adhesive property of the block copolymer and impart reactivity with isocyanates. An amount of about 2% w hydroxy or acid functional groups has worked well as shown in the Examples below. The data presented indicate the surprising result that the maleic anhydride-functionalized polymer reacts more quickly than the 2-hydroxyethylacrylate-functionalized polymer. Convention chemistry would lead one to the opposite conclusion.

The amine functionalized block copolymers of the present invention are made by first forming an acid modified block copolymer as described above and then reacting this polymer with ammonia. This reaction is carried out in the same type of extrusion equipment as is used in the grafting.

The carboxylic acid-functionalized block copolymer (styrene block) to which amine functionality is to be added is converted to an amine group-containing carboxamide-functionalized polymer by reaction with ammonia in liquid phase solution in a polar reaction diluent or a mixture of a polar reaction diluent and inert organic solvent, meaning a solvent that does not react with any of the substances participating in the reaction, followed by the application of heat to convert the ammonium salt groups initially formed to carbamoyl groups as described in copending, commonly assigned application Ser. No. 503,412, filed Mar. 30, 1990, which is herein incorporated by reference. In a typical procedure the carboxylic acid-functionalized block polymer is dissolved in the polar reaction diluent and contacted with anhydrous ammonia. The ammonia is preferably provided as gaseous ammonia which is passed into the polymer solution at pressures up to about 150 psig, preferably up to about 100 psig. The ammonia is typically added at temperatures from about 10° C. to about 60° C. and is conveniently introduced into the polymer solution as by bubbling at the ambient temperature of the addition. The ammonium salt which initially results from this contacting is isolated, if desired, by known techniques such as solvent removal or precipitation. It is preferred, however, to further react this ammonium salt in situ without isolation to the carbamoyl-functionalized polymer. This conversion is accomplished by heating the ammonium salt intermediate to an elevated temperature and pressure. The carbamoyl-functionalized polymer is then recovered from the product mixture by conventional methods such as selective extraction or precipitation with a non-solvent such as methanol or isopropanol.

The carbamoyl-functionalized polymers of the invention are the selectively hydrogenated block polymers having, as an average, a plurality of carbamoyl moieties, i.e., —CONH$_2$ groups, as substituents on aromatic ring carbon atoms of the aromatic portion of the polymer molecule. However, under the conditions of the reaction with ammonia a substantial proportion, generally more than about 60% and often more than about 80%, of the carboxylic acid groups will be converted to carbamoyl moieties so that the carbamoyl-funtionalzied polymer will contain an average of from about 5 to about 16 carboxamide groups per molecule, more often from about 8 to about 15 carboxamide moieties per molecule, randomly found throughout the aromatic portion of the molecule.

Isocyanate Crosslinking

Isocyanate is used to crosslink the functionalized, selectively hydrogenated block copolymer via reaction with the functionality present in the polymer. The hydroxy, acid or amine functionality is randomly dispersed throughout the polymer on the conjugated diene blocks. There are usually an average of eight functionalities per molecule when about 2% w hydroxyethyl acrylate is grafted onto a 50,000 molecular weight block copolymer. For example, the functionalized polymer may be represented as follows:

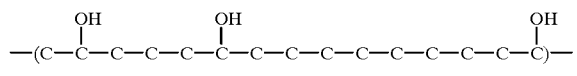

An isocyanate, such as represented by:

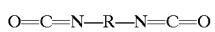

is reacted with a functionalized polymer to create a crosslinked polymer. The reaction may be represented as follows:

Polyurethane

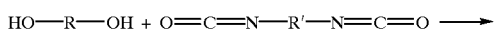

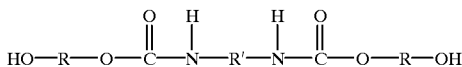

Polyurea

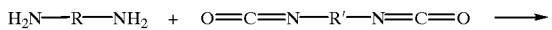

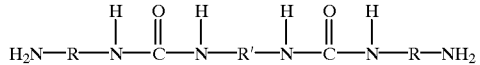

where R is the selectively hydrogenated block copolymer. Standard polyurethane and/or polyurea chemistry is utilized for the reaction of the functionalized polymer with the isocyanate. For example, see "Coatings Based on Polyurethane Chemistry: An Overview and Recent Developments" by T. A. Potter and J. L. Williams, *Journal of Coatings Technology*, Volume 59, number 749, June 1987, pages 63–72, which is herein incorporated by reference.

Monomeric isocyanates can be used for the crosslinking of the functionalized polymers. Examples of monomeric isocyanates which are commonly used and are commercially available are as follows:

Monomeric Isocyanates

Toluene diisocyanate (TDI) (MONDUR TD)

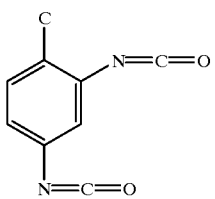

Diphenyl methane diisocyanate (MDI) (MONDUR M)

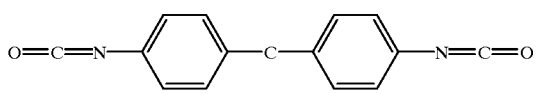

-continued

| | |
|---|---|
| Dicyclohexyl methane diisocyante (HMDI) (DESMODUR W) | 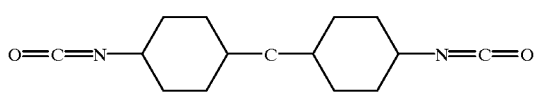 |
| Hexane diisocyanate (HDI) (DESMODUR H) | 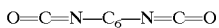 |
| Isophorone diisocyanate (IPDI) | 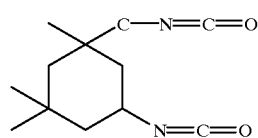 |

Monomeric isocyanates suffer from the disadvantage that they are highly toxic. In order to reduce the problems caused by using such materials, isocyanate adducts are often used in place of the monomeric isocyanates. Both types have the advantage that the reaction will take place at room temperature. Normally, aliphatic isocyanates require a tin catalyst to make the reaction proceed quickly. Examples of isocyanate adducts which are commonly used and are commerically available are as follows:

Isocyanate Adducts

It is also possible to use blocked isocyanates. Isocyanates are blocked by reaction with a volatile hydroxy material in order to keep them from reacting with the functionalized block copolymer. The isocyanate is regenerated when heat is applied. This is described in the article referred to above. Such blocked isocyanates are useful, for example, in baked coatings. The material will be coated onto a substrate which will then be heated. The blocking agent will leave the coating under the influence of heat and crosslinking of the functionalized block copolymer will take place. Examples of

| | |
|---|---|
| (TDI)$_3$/TMP | 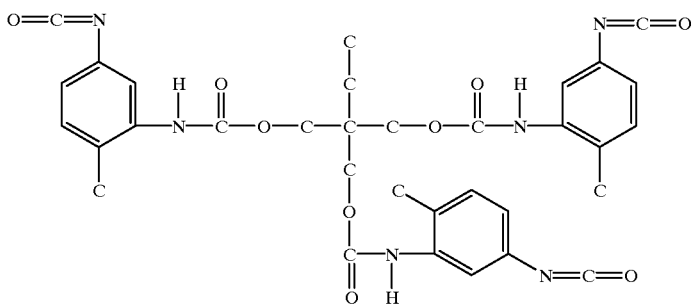 |
| (HDI)$_3$ biuret (DESMODUR N-3200) | 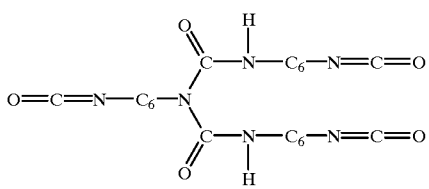 |
| (HDI)$_3$ isocyanurate | 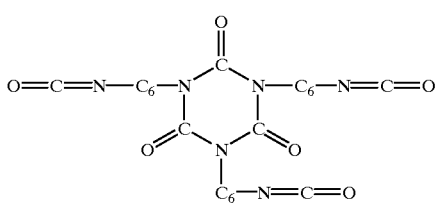 | blocked isocyanates which are commonly used and are commercially available are as follows:
Blocked Isocyanates (2EH)₃[(TDI)₃/TMP]₁

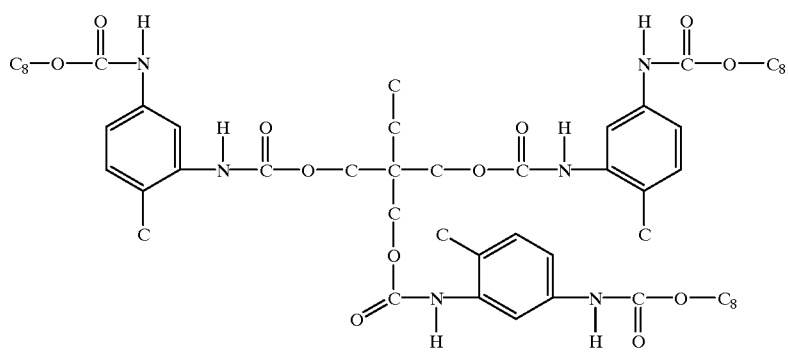

E-Caprolactam/TDI
(DESMODUR BL1260)

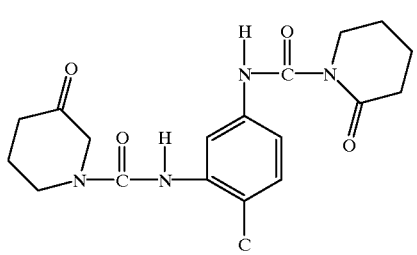

Butanone oxime/HDI isocyanurate

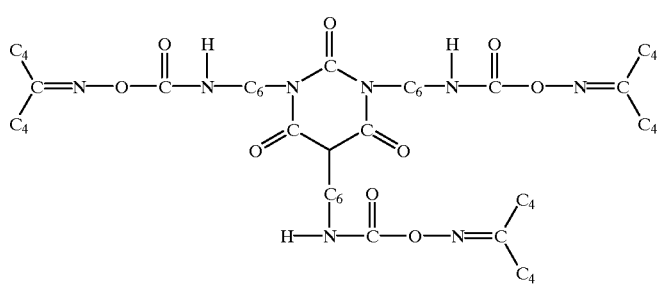

Another embodiment of the present invention is a moisture cured composition. Such compositions are especially useful for coatings where a single component product is desirable. It can be applied and moisture will cure it over time. The functionalized polymer is reacted with a large excess of isocyanate to cap rather than crosslink the composition as described above. The monomeric isocyanate must be used in this moisture cured composition because it will not crosslink as easily. Next, the composition is contacted with water either before or after, even well after, it is used to make a coating or other product. The contacting with water may simply be with water which is present in the atmosphere. The composition will cure to produce the desired crosslinked composition. For example, the reaction may take place as follows:

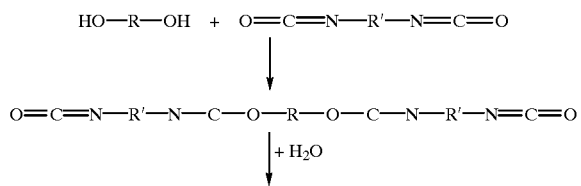

-continued

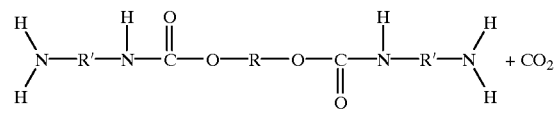

The crosslinked materials of the present invention are useful in adhesives (including pressure sensitive adhesives, contact adhesives, laminating adhesives and assembly adhesives), sealants, coatings, films (such as those requiring heat and solvent resistance), modified asphalts, etc. In addition to the functionalized polymer and isocyanate, products formulated to meet performance requirements for particular applications may include various combinations of the following types of ingredients.

Resin

In many applications, especially in adhesives and sealants, it may be necessary to add an adhesion promoting or tackifying resin that is compatible with the rubbery midblock of the polymer. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from about 10 to about 400 parts by weight per hundred parts rubber (phr), preferably between about 20 to about 350 phr. The selection of the particular tackifying agent is, in large part, dependent upon the specific polymer employed in the respective adhesive composition.

Optionally, an arene-block-compatible resin may be employed. Compatibility is judged by the method disclosed in U.S. Pat. No. 3,917,607. Normally, the resin should have a softening point above about 100° C., as determined by ASTM method E 28, using a ring and ball apparatus. Mixtures of arene block-compatible resins having high and low softening points may also be used. Useful resins include coumaroneindene resins, polystyrene resins, vinyl toluene-alphamethylstyrene copolymers, and polyindene resins. Much preferred is a coumarone-indene resin. The amount of arene-block-compatible resin varies from 0 to about 200 phr.

Plasticizer

The adhesive composition of the instant invention may contain plasticizers, such as rubber extending plasticizers, or compounding oils. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 500 phr, preferably between about 0 to about 100 phr, and most preferably between about 0 and about 60 phr.

Filler

Various types of fillers and pigments can be included in the coating formulation. This is especially true for exterior coatings in which fillers are added not only to create the desired appeal but also to improve the performance of the coating such as its weatherability. A wide variety of fillers can be used. Suitable fillers include calcium carbonate, clays, talcs, zinc oxide, titanium dioxide and the like. The amount of filler usually is in the range of 0 to about 65% w based on the solvent free portion of the coating, depending on the type of filler used and the application for which the coating is intended. An especially preferred filler is titanium dioxide.

Solvent

If the coating will be applied from solvent solution, the organic portion of the coating will be dissolved in a solvent or blend of solvents. Aromatic hydrocarbon solvents such as toluene, xylene, or Shell Cyclo Sol 53 are suitable. If desired, it is usually possible to obtain lower viscosity by using a solvent blend consisting of an aromatic hydrocarbon solvent with a polar solvent. Suitable polar solvents include esters such as isopropyl acetate, ketones such as methyl isobutyl ketone, and alcohols such as isopropyl alcohol. The amount of polar solvent used depends on the particular polar solvent chosen and on the level of functionality on the functionalized hydrogenated block copolymer. Usually, the amount of polar solvent used is between 0 and 50% w in the solvent blend.

Stabilizer

Antioxidants and UV inhibitors can be added to the formulations to protect the products against degradation by oxidation or by exposure to sunlight during preparation and use of the compositions. Combinations of stabilizers are often more effective, due to the different mechanisms of degradation to which various polymers are subject.

The primary component of the antioxidant portion of the stabilizer package will be a hindered phenol type antioxidant. Examples of commercially available antioxidants of this type are ETHANOX 330 (from Ethyl Corporation), CYANOX 2246 (from American Cyanamid) and IRGANOX 1010 (from Ciba Geigy). A wide variety of secondary antioxidants and synergists can also be included in the formulation. Examples include zinc dialkyl dithiocarbamates such as BUTYL ZIMATE (from Vanderbilt), phosphite esters such as WESTIN 618 (from General Electric), and sulfur bearing compounds such as dilaurylthio-dipropionate, CYANOX LTDP (from American Cyanamid). Antioxidants are usually used in the formulation at concentrations from about 0.05% w to about 5% w.

The UV inhibitor portion of the stabilizer package will usually be composed of a combination of a UV light absorbing type compound and a hindered amine light stabilizer. Typical absorbing type UV inhibitors include the benzophenone type such as CYASORB UV 531 (from American Cyanamid) and the benzotriazole type such as TINIVIN P and TINUVIN 328 (both from Ciba Geigy). Typical hindered amine light stabilizers include TINUVIN 770 (from Ciba Geigy) and SANDUVOR 3056 (from American Cyanamid). UV inhibitors which contain a metal, such as the nickel containing UV inhibitor, CYASORB U7 1084 (from American Cyanamid) can also be used. These UV inhibitors will generally be included in the formulation at concentrations from about 0.05% w to 10% w.

Protective pigments and fillers can also improve the resistance to degradation by exposure to sunlight. Examples include carbon black, zinc oxide and titanium dioxide.

Asphalt is a common material utilized for the preparation of paving materials and for other uses. While the material is suitable in many respects, it is inherently deficient in some physical properties which it is highly desirable to improve. Styrene-rubber block copolymers have been used to dramatically improve the thermal and mechanical properties of asphalts.

It has been found that the functionalized block polymers of the present invention can be used to enhance the physical properties of asphalt materials by blending therewith and crosslinking the polymer with an isocyanate. The asphalt may comprise a bituminous component which may be a naturally occurring bitumen or derived from a minerial oil. Also, petroleum derivatives obtained by a cracking process, pitch and cold tar can be used as the bituminous component as well as blends of various bituminous materials. Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues, or with oils. Compatible asphalts are preferred for use herein. Compatible asphalts are those which will give a blend which does not phase separate upon standing. The crosslinked functionalized block copolymers generally comprise from about 1 to about 35 weight percent of the overall asphalt/polymer composition.

The following examples illustrate the preparation of crosslinked compositions in accordance with the present invention and are not intended to limit the invention to the specific compounds and process steps that are described.

Preparation and Evaluation Procedures

As is well known in polyurethane technology, care must be taken to exclude water from the compositions because it can react with the isocyanate and change the stochiometry of NCO/OH ratio of the isocyanate to hydroxy, acid or amine functional polymer. Therefore, in the examples in this work, the functional polymers were dried for 2 hours in a vacuum oven at 120° C. The polymer was then dissolved in the solvent. MOL SIEVE 4A (from UOP) was then added to the solution, the solution was agitated overnight and the MOL SIEVE was removed. The isocyante portion of the formulation was then added and test samples were prepared immediately.

For the use of these crosslinked compositions in adhesives, coatings or sealants, the method of application, the coating thickness and type of substrate used, the drying/curing procedure used and the tests used to evaluate the performance of the product are very much a function of the type of application in which it will be used. In this work, only generally applicable screening tests were used to assess the utility of these compositions without a specific target application.

The functional SEBS polymer was dissolved in a solvent at about 15–25% w solids. The appropriate isocyanate was then added to aliquots of the solution at various hydroxyl/isocyanate molar ratios. The compositions were coated onto the appropriate substrates with a doctor blade. In this work, all of the coatings were dried at 25° C.

Clarity—The coating was applied to steel panels (QD412 panels from Q-Panel Corp.) at about 2 mil dry film thickness (DFT). After drying/curing for 2 weeks at 25° C., haziness or clarity of the film was judged qualitatively by visual inspection. Good clarity of the film is an indicator of good compatibility between the particular isocyanate and the functional SEBS polymer. In many applications, clarity is not required so isocyanates which give hazy or opaque films can be considered. This would be the case for pigmented products or blends with asphalt. However, in some applications, high clarity is required and so only compatible isocyanates can be considered. Examples of applications in which clarity would be required include clear topcoat coatings, transparent sealants and caulks, and adhesives for laminating printed films or foils.

Zero T Bend—The coating was applied to 25 mil thick QD412 panels at about 2 mil coating DFT. After drying/curing for 2 weeks at 25° C., the coated metal was bent back on itself, metal to metal, with the coating on the outside. The coating in the bent area is then inspected under magnification for cracking or adhesion loss. This test is a measure of the flexibility and adhesion of the coating.

Solvent Resistance—The coating was applied to an aluminum panel (A412 panels from Q-Panel Corp.) at about 2 mil DFT and dried/cured 2 weeks at 25° C. A strip of coated aluminum was then immersed in toluene. After soaking overnight in toluene, the strip was removed and the gel structure of the coating swollen with toluene was rated. A "poor" rating indicates the coating had no resistance to the solvent and merely dissolved. A "fair" rating indicates that the coating had only a loose gel structure and that it remained only poorly bonded to the aluminum while immersed in toluene. A "good" rating indicates the coating had a fairly tight gel structure and it remained well adhered to the aluminum when immersed in toluene. This test simulates the ability of an adhesive or coating to maintain its integrity and adhesion during exposure to hydrocarbon solvents such as gasoline.

Rate of Cure—The coating was applied to 1 mil thick polyester film (MYLAR film from DuPont) at about 2 mil coating DFT. Gel content was measure as a function of dry/cure time at 25° C. Gel content is the fraction of the coating material (expressed as % w) which is insoluble in toluene after dry/cure has taken place for a certain period of time. To determine gel content, a 2×3 inch piece of coated Mylar is weighed, soaked in toluene to extract uncured material, dried and reweighed. Gel content is calculated after correcting the data for the weight of the uncoated Mylar and the weight of any unfunctionalized material.

EXAMPLE 1

Preparation of the Hydroxy Functional SEBS Polymer

A commercially available, selectively hydrogenated block copolymer, KRATON® G1652 Rubber (an S-EB-S block copolymer available from Shell Chemical Company), was used in the preparation of the functionalized block copolymer used in this work. The hydroxy functional SEBS polymer was prepared by melt reacting KRATON® G1652 with 3.0% w hydroxyethylacrylate (HEA) in the presence of 0.2% w 2,5-dimethyl-2,5-di(t-butylperoxy)hexane (LUPERSOL 101 from Pennwalt Corp.) in a twin screw extruder using the procedure disclosed in U.S. Pat. No. 4,578,429.

The structure of the resulting hydroxy functional SEBS polymer is not well characterized. One hydroxyl group could be added at each site or several could be located at one site. However, data suggest that about 2% w HEA was actually grafted onto the rubber block of the polymer. The site of grafting onto the rubber and the number of HEA mers reacted at each site were not determined. Despite the lack of definition about the exact structure of this polymer, the hydroxyl equivalent weight of this polymer was taken to be 5800 grams of hydroxy functional SEBS polymer per mole of hydroxyl group.

EXAMPLE 2

Preparation of the Carboxylic Acid Functional SEBS Polymer

The carboxy functional SEBS polymer was prepared by melt reacting KRATON® G1652 with 3% w maleic anhydride in the presence of 0.2% w LUPERSOL 101 in a twin screw extruder using the procedure disclosed in U.S. Pat. No. 4,578,429. The resulting maleated polymer contained 2% w maleic anhydride grafted onto the SEBS polymer. The anhydride ring was opened by exposure to moisture to give the carboxylic acid functional SEBS polymer. Again the exact structure of this polymer was not determined. However, the carboxyl equivalent weight of this polymer was taken to be 2500 grams of carboxy functional SEBS polymer per mole of carboxy groups.

EXAMPLE 3

Functional SEBS Cured With Trifunctional Isocyanate

Room temperature curing, two component coatings were prepared by combining the trifunctional aromatic isocyanate, MONDUR CB-60 (from Mobay), or the trifunctional aliphatic isocyanate, DESMODUR N-3200 (from Mobay), with either the hydroxy functional SEBS polymer of example 1 or the carboxy functional SEBS polymer of example 2. Performance is given in Tables 1–4.

The clarity results in Tables 1 and 3 show that the aromatic isocyanate has only limited compatibility with the hydroxy functional SEBS and fairly poor compatibility with the carboxy functional SEBS, especially at the higher —NCO concentrations. Thus, the aromatic isocyanate could only be used in products in which clarity was not a requirement. Results of the zero T bend test show that the aromatic isocyanate gives coatings with both polymers which have excellent flexibility and adhesion. Solvent resistance is good for the coatings with the hydroxy functional SEBS but only fair with the carboxy functional SEBS.

The clarity results in Tables 2 and 4 show that the aliphatic isocyanate has excellent compatibility with the hydroxy functional SEBS and much better compatibility with the carboxy functional SEBS than the aromatic isocyanate. Coatings containing the aliphatic isocyanate and the hydroxy functional SEBS have excellent clarity and would be preferred for those applications in which clarity is required. Results of the zero T bend test show that the aliphatic isocyanate also gives coatings having excellent flexibility and adhesion. Good solvent resistance was observed with the carboxy functional SEBS over the entire —OH/—NCO range studied. However, with the hydroxyl functional SEBS, solvent resistance improved at higher —NCO/—OH ratios.

EXAMPLE 4

Prior Art EB Diol Cured With Trifunctional Isocyanate

Hydroxy functional, hydrogenated polybutadiene (—OH fnct'l EB) diols and their use with isocyanates in polyurethanes are known in the patent literature. To distinguish between the isocyanate cured, functional SEBS block copolymers of this invention and isocyanate cured functional EB homopolymers of prior art, a commercially available, 2000 molecular weight, hydrogenated polybutadiene having one primary hydroxyl group on each end was tested. The —OH fnct'l EB diol used was POLYTAIL HA (from Mitsubishi). It was tested as room temperature curing, two component coatings by combining it with the same two trifunctional isocyanates used in example 3. Results are given in Table 5 and 6.

The clarity results in Table 5 show that the —OH fnct'l EB diol has poor compatibility with the trifunctional aromatic isocyanate, MONDUR CB-60, over the entire range of —OH/NCO ratios. The good solvent resistance found for the cured coatings shows that MONDUR CB-60 is indeed reactive with the hydroxy groups of the diol, curing it into a good gel network. However, unlike the coatings of example 3 which were essentially non tacky, the coatings made with the EB diol remained very tacky, even after 2 weeks cure. The high tack of these coatings renders them unsuitable for use in practical coatings and so zero T bends were not made with these samples.

The clarity results in Table 6 show that the EB diol has quite good compatibility with the trifunctional aliphatic isocyanate, DESMODUR N-3200. The good solvent resistance found for the coatings after 2 weeks cure shows that this aliphatic isocyanate is indeed effective in curing the EB diol forming a crosslinked network structure. However, again the coatings were too soft and tacky to be useful in practical coatings and so zero T bends were not made with these samples.

EXAMPLE 5

Rate of Cure

Room temperature curing, two component coatings were prepared containing either the hydroxy functional SEBS of example 1 or the carboxy functional SEBS of example 2 at a 1/1 —OH/—NCO ratio with the trifunctional aliphatic isocyanate (DESMODUR N-3200). The rate of cure was measured without catalyst and with 0.1% w dibutyltindilaurate (BAYSILONE 162 from Mobay) by measuring gel content of the coatings periodically after combining the functional SEBS polymer and the isocyanate.

Results in Table 7 show that, in the absence of the catalyst, the coating based on the hydroxyl functional SEBS cured quite slowly. Over half of the hydroxyl functional SEBS molecules still remained uncured 7 days after the coating was applied to the substrate. Surprisingly, the carboxy functional SEBS cured very quickly in the absence of the catalyst. Over half the carboxy functional SEBS molecules were cured at only 1 day after the coating was applied. Results show that, in the presence of the catalyst, both the hydroxyl functional SEBS and the carboxy functional SEBS cured rapidly. Over half the SEBS molecules were cured after only 1 day and the gel contents after 7 days were quite high.

EXAMPLE 6

Hydroxyl Functional SEBS Cured With Difunctional Isocyanate

Room temperature curing, two component coatings were prepared with the hydroxy functional SEBS polymer of example 1 using three different difunctional isocyanates at various —OH/—NCO ratios. The isocyanates used were one aromatic isocyanate, MONDUR M, and two aliphatic isocyanates, ESMODUR W and Isophorone diisocyanate. MONDUR M is diphenyl methane diisocyanate (MDI) from Mobay. DESMODUR W is dicyclohexyl methane diisocyanate (HMDI) from Mobay. Isophorone diisocyanate (IPDI) is from Huls. Dibutyltindilaurate catalyst was used with the aliphatic isocyanates at a concentration of 0.05% weight of the isocyanate concentration. The coatings were compared in their clarity and the time required for the coating to cure to give fair to good solvent resistance. Results are given in Tables 8–10.

Results in Table 8 show that MDI, the aromatic isocyanate, is very effective in curing the hydroxy functional polymer. The coating prepared at an NCO/OH ratio of 0.5 required 2 days to cure sufficiently to give the coating good solvent resistance. Coatings prepared at NCO/OH ratios from 1 to 3 required only 1 day or less to cure sufficiently to give the coatings good solvent resistance. It was observed qualitatively that these coatings remained well adhered to the aluminum panels during immersion in toluene, demonstrating that the MDI cured coatings have good adhesion. However, the haziness of the coatings increased with increasing MDI concentration. Thus, MDI would not be suitable for use in adhesives, sealants or coatings in which clarity was a requirement.

Results of studies with the two aliphatic isocyanates, HMDI and IPDI, are shown in Tables 9 and 10. Results show that both isocyanates give clear coatings with the hydroxy functional SEBS, showing that they both have good compatibility with the polymer. Both HMDI and IPDI were effective in curing the polymer although, at the level of catalyst used, longer cure times were required to develop fair solvent resistance in the coatings compared to coatings based on MDI. It was observed qualitatively that, unlike the coatings based on MDI which remained well adhered to the aluminum while immersed in toluene, the cured coatings based on HMDI and IPDI had a well formed gel structure but were only poorly adhered to the aluminum. Thus, HMDI and IPDI are better suited for use in adhesives, sealants and coatings in which clarity is required but adhesion requirements are only modest.

TABLE 1

|  | 1 | 2 | 3 | 4 | 5 |
|---|---|---|---|---|---|
| Composition, %w | | | | | |
| —OH fnct'l SEBS | 25 | 24.7 | 24.6 | 24.5 | 24.4 |
| MONDUR CB-60 | | 1.4 | 1.7 | 2.1 | 2.6 |
| Toluene | 75 | 73.9 | 73.7 | 73.4 | 73 |
| —OH/—NCO ratio | — | 1/.8 | 1/1 | 1/1.25 | 1/1.5 |
| Properties of coatings on steel after 2 weeks cure at 25° C. | | | | | |
| Clarity | Clear | Very hazy | Very hazy | Very hazy | Very hazy |
| Zero T Bend | Pass | Pass | Pass | Pass | Pass |
| Solvent Resistance | Poor | Good | Good | Good | Good |

TABLE 2

|  | 1 | 2 | 3 | 4 | 5 |
|---|---|---|---|---|---|
| Composition, %w | | | | | |
| —OH fnct'l SEBS | 25 | 24.8 | 24.8 | 24.8 | 24.7 |
| DESMODUR N-3200 | | 0.6 | 0.8 | 1.0 | 1.2 |
| BAYSILONE 162 | | 0.0006 | 0.0008 | 0.0010 | 0.0012 |
| Toluene | 75 | 74.5 | 74.4 | 74.3 | 74.1 |
| —OH/—NCO ratio | — | 1/.8 | 1/1 | 1/1.25 | 1/1.5 |
| Properties of coatings on steel after 2 weeks cure at 25° C. | | | | | |
| Clarity | Clear | Clear | Clear | Clear | Clear |
| Zero T Bend | Pass | Pass | Pass | Pass | Pass |
| Solvent Resistance | Poor | Fair | Fair | Good | Good |

TABLE 3

|  | 1 | 2 | 3 | 4 | 5 |
|---|---|---|---|---|---|
| Composition, %w | | | | | |
| —COOH fnct'l SEBS | 25 | 24.2 | 24.0 | 23.7 | 23.5 |
| MONDUR CB-60 | | 3.3 | 4.1 | 5.1 | 6.0 |
| Toluene | 75 | 72.5 | 71.9 | 71.2 | 70.5 |
| —OH/—NCO ratio | — | 1/.8 | 1/1 | 1/1.25 | 1/1.5 |
| Properties of coatings on steel after 2 weeks cure at 25° C. | | | | | |
| Clarity | Clear | Very hazy | Very hazy | Opaque | Opaque |
| Zero T Bend | Pass | Pass | Pass | Pass | Pass |
| Solvent Resistance | Poor | Fair | Fair | Fair | Fair |

TABLE 4

|  | 1 | 2 | 3 | 4 | 5 |
|---|---|---|---|---|---|
| Composition, %w | | | | | |
| —COOH fnct'l SEBS | 15 | 14.9 | 14.8 | 14.8 | 14.7 |
| DESMODUR N-3200 | | 0.9 | 1.2 | 1.5 | 1.7 |
| BAYSILONE 162 | | 0.0009 | 0.0012 | 0.0015 | 0.0017 |
| Toluene | 85 | 84.2 | 84.0 | 83.8 | 83.5 |
| —OH/—NCO ratio | — | 1/.8 | 1/1 | 1/1.25 | 1/1.5 |
| Properties of coatings on steel after 2 weeks cure at 25° C. | | | | | |
| Clarity | Clear | Clear | Hazy | Very hazy | Very hazy |
| Zero T Bend | Pass | Pass | Pass | Pass | Pass |
| Solvent Resistance | Poor | Good | Good | Good | Good |

TABLE 5

|  | 1 | 2 | 3 | 4 | 5 |
|---|---|---|---|---|---|
| Composition, %w | | | | | |
| —COOH fnct'l EB | 60 | 50.3 | 48.3 | 46.0 | 44.0 |
| MONDUR CB-60 | | 16.2 | 19.5 | 23.3 | 26.7 |
| Toluene | 40 | 33.5 | 32.2 | 30.7 | 29.3 |
| —OH/—NCO ratio | — | 1/.8 | 1/1 | 1/1.25 | 1/1.5 |
| Properties of coatings on steel after 2 weeks cure at 25° C. | | | | | |
| Clarity | Clear | Opaque | Opaque | Opaque | Opaque |
| Zero T Bend | | Not run because coatings were too tacky | | | |
| Solvent Resistance | Poor | Good | Good | Good | Good |

TABLE 6

|  | 1 | 2 | 3 | 4 | 5 |
|---|---|---|---|---|---|
| Composition, %w | | | | | |
| —OH fnct'l EB | 60 | 55.2 | 54.1 | 52.8 | 51.6 |
| DESMODUR N-3200 | | 8.0 | 9.8 | 12.0 | 14.0 |
| BAYSILONE 162 | | 0.008 | 0.010 | 0.012 | 0.014 |
| Toluene | 40 | 36.8 | 36.1 | 35.2 | 34.4 |
| —OH/—NCO ratio | | 1/.8 | 1/1 | 1/1.25 | 1/1.5 |
| Properties of coatings on steel after 2 weeks cure at 25° C. | | | | | |
| Clarity | Clear | Slight Haze | Slight Haze | Slight Haze | Slight Haze |
| Zero T Bend | | Not run because coatings were too tacky | | | |
| Solvent Resistance | Poor | Good | Good | Good | Good |

TABLE 7

|  | 1 | 2 | 3 | 4 |
|---|---|---|---|---|
| Composition, % w | | | | |
| —OH Fnct'l SEBS | 19.88 | | 19.88 | |
| —COOH Fnct'l SEBS | | 19.69 | | 19.69 |
| DESMODUR N-3200 | 0.62 | 1.55 | 0.62 | 1.55 |
| BAYSILONE 162 | | | 0.006 | 0.0015 |
| Toluene | 79.51 | 78.76 | 79.51 | 78.76 |
| Amount of coating material which has gelled at 25° C. | | | | |
| After 1 day | 0 | 59 | 52 | 59 |
| After 2 days | 9 | 63 | 58 | 63 |
| After 4 days | 33 | 66 | 67 | 68 |
| After 7 days | 41 | 79 | 79 | 78 |

TABLE 8

|  | 1 | 2 | 3 | 4 | 5 |
|---|---|---|---|---|---|
| Composition, %w | | | | | |
| —OH fnct'l SEBS | 19.94 | 19.94 | 19.88 | 19.83 | 19.77 |
| MONDUR M (MDI) | 0.28 | 0.43 | 0.66 | 0.87 | 1.28 |
| Xylene | 79.84 | 79.63 | 79.47 | 79.30 | 78.95 |
| Mole —NCO/—OH | 0.5 | 1 | 1.5 | 2 | 3 |
| Clarity of dried coatings on aluminum panels | Slight Haze | Slight Haze | Hazy | Very Hazy | Very Hazy |

TABLE 8-continued

|  | 1 | 2 | 3 | 4 | 5 |
|---|---|---|---|---|---|
| Cure time @ 25° C. required for coating to develop fair-good solvent resistance, days | 2 | 1 | 1 | <1 | <1 |

TABLE 9

|  | 1 | 2 | 3 | 4 | 5 |
|---|---|---|---|---|---|
| Composition, %w |  |  |  |  |  |
| —OH fnct'l SEBS | 19.94 | 19.92 | 19.86 | 19.81 | 19.73 |
| DESMODUR W (HMDI) | 0.22 | 0.45 | 0.68 | 0.89 | 1.33 |
| BASILONE 162 | 0.00012 | 0.00022 | 0.00033 | 0.00043 | 0.00067 |
| Xylene | 79.84 | 79.63 | 79.47 | 79.30 | 78.95 |
| Mole —NCO/—OH | 0.5 | 1 | 1.5 | 2 | 3 |
| Clarity of dried coatings on aluminum panels | Clear | Clear | Clear | Clear | Clear |
| Cure time @ 25° C. required for coating to develop fair-good solvent resistance, days | 7 | 4 | 2 | 2 | 2 |

TABLE 10

|  | 1 | 2 | 3 | 4 | 5 |
|---|---|---|---|---|---|
| Composition, %w |  |  |  |  |  |
| —OH fnct'l SEBS | 19.98 | 19.90 | 19.88 | 19.86 | 19.79 |
| ISOPHORONE DIISOCYANATE | 0.18 | 0.39 | 0.57 | 0.76 | 1.13 |
| BAYSILONE 162 | 0.00010 | 0.00018 | 0.00029 | 0.00037 | 0.00056 |
| Xylene | 79.84 | 79.72 | 79.55 | 79.38 | 79.08 |
| Mole —NCO/—OH | 0.5 | 1 | 1.5 | 2 | 3 |
| Clarity of dried coatings on aluminum panels | Clear | Clear | Clear | Clear | Clear |
| Cure time @ 25° C. required for coating to develop fair-good solvent resistance, days | 4 | 4 | 4 | 4 | 2 |

I claim:

1. A moisture curable, isocyanate-capped hydroxy-functionalized selectively hydrogenated block copolymer of a vinyl aromatic hydrocarbon and a conjugated diene.

* * * * *